United States Patent

Oosawa et al.

[11] Patent Number: 5,192,175
[45] Date of Patent: Mar. 9, 1993

[54] BURR TRIMMING METHOD AND APPARATUS FOR MACHINING SHOCK TESTING PIECES, AND AUTOMATIC MACHINING SYSTEM THEREOF

[75] Inventors: Morio Oosawa, Ibaraki; Takeo Ikeda, Hitachi; Yuji Nezu, Hitachi; Yosio Kamijyo, Hitachi, all of Japan

[73] Assignee: Hitachi, Ltd., Tokyo, Japan

[21] Appl. No.: 370,867

[22] Filed: Jun. 23, 1989

[30] Foreign Application Priority Data

Jul. 6, 1988 [JP] Japan .................. 63-166762

[51] Int. Cl.⁵ .................. B23D 13/00
[52] U.S. Cl. .................. 409/345; 409/297
[58] Field of Search .................. 409/293, 300, 301, 297, 409/298, 299, 140, 139, 9, 345, 346, 303; 29/33 A; 407/114, 9

[56] References Cited

U.S. PATENT DOCUMENTS

| | | | |
|---|---|---|---|
| 2,181,810 | 11/1939 | Hawk | 409/301 |
| 2,458,995 | 1/1949 | Hummer | 407/9 |
| 2,694,343 | 11/1954 | Quirolo | 409/301 |
| 2,838,828 | 6/1958 | Nordstrom | 409/301 X |
| 2,962,800 | 12/1960 | Swenson | 407/9 |
| 3,523,349 | 8/1970 | Pollington et al. | 407/9 X |
| 4,640,156 | 2/1987 | Nakagawa et al. | 407/10 X |

FOREIGN PATENT DOCUMENTS

| | | | |
|---|---|---|---|
| 71022 | 4/1983 | Japan | 409/301 |
| 260998 | 11/1986 | Japan | |
| 523762 | 10/1976 | U.S.S.R. | 407/9 |
| 544516 | 2/1977 | U.S.S.R. | 407/10 |
| 709265 | 1/1980 | U.S.S.R. | 407/10 |

Primary Examiner—Daniel W. Howell
Attorney, Agent, or Firm—Antonelli, Terry, Stout & Kraus

[57] ABSTRACT

Burrs which have formed on a testing piece during machining a groove or notch in the testing piece can be removed by a method of using machining wherein a cutting edge is pressed onto a surface of the testing piece where the burrs have formed, and is moved in this condition from an opening of the groove along the testing piece to trim these burrs off. A tool employed to carry out this method comprises a body including a cushion mechanism, a holder which is supported on one surface of this body through the cushion mechanism, and the cutting edge which is fixed to this holder.

15 Claims, 12 Drawing Sheets

BURR TRIMMING METHOD AND APPARATUS FOR MACHINING SHOCK TESTING PIECES, AND AUTOMATIC MACHINING SYSTEM THEREOF

BACKGROUND OF THE INVENTION

The present invention relates to a technique of trimming burrs which have formed on a metallic material during its machining and, more particularly, to a burr trimming method and apparatus which are optimum for removing burrs remaining on testing pieces for use in a shock testing, and an automatic machining system of such shock testing pieces.

As a method of removing burrs, formed on a metallic material during machine cutting, without excessively trimming or scratching the manufactured article, manual operations which have conventionally been in practice have been the most efficient, and presently no method or apparatus for automatically removing the burrs has not been proposed.

In, for example, Japanese Unexamined Patent Publication No. 61-260998, an apparatus is disclosed for removing flashes which have formed on a resin mold. Such apparatus has a cutter, which moves along a portion of each mold where the flashes have formed, provided with a vibration generator and a heating coil, so that the heated cutter is vibrated to remove the flashes.

In consideration of the above-mentioned apparatus which has been used conventionally, vibration may be utilized for removing burrs which have formed on a metallic material during its machining. It is, however, difficult to automatically control positioning of the cutting tool for completely removing the burrs alone without excessively trimming or scratching the machined material on which only little tolerances are given in manufacturing.

In the shock test of a metallic material, testing pieces having prescribed grooves or notches formed therein are used. It is necessary for this test to prepare a number of these testing pieces having a certain shape, and therefore the testing pieces are produced by an automatic machining system wherein metallic materials are cut and divided into rectangular shaped pieces, and then, formed with U-shaped or V-shaped grooves by a cutter. Burrs are produced on the grooves during this machining and such burrs are not allowed to remain because the characteristics of the testing pieces are influenced by them. Heretofore, however, burr removing cannot be performed on any automation line, and as a result, the burrs remaining within the grooves are removed manually. It is desirable to automate the operation of completely removing the burrs so as to supply these testing pieces of uniform characteristics at a lower cost.

SUMMARY OF THE INVENTION

One object of the present invention is to provide a method of completely and automatically removing burrs which have formed on grooves of machined pieces.

Another object of the invention is to provide a method of removing the burrs by a cutting tool during a series of machinings of the testing pieces including the groove machining.

The present invention has a still another object of providing a burr trimming apparatus which is suitable for carrying out the above methods.

A still further object of the present invention is to provide an automatic machining system of the testing pieces, wherein the burrs can be automatically and completely removed without any manual operation so as to automate the entire series of machinings of the machined pieces.

The burrs cannot be perfectly removed by machining, because a cutting tool is rotated while chips are thrown out and remain in the rotational direction. The present invention is to achieve the above objects by moving a cutting tool linearly, without rotating the same, along one direction over a portion where the burrs remain.

According to one aspect of the present invention, a method of trimming burrs which have formed on a testing piece during its machining is provided, which method includes chamfering corners and ridges of the testing piece after it has been cut out to have a given shape; chamfering bottom ridges of the same; and succeedingly automatically trimming burrs which have formed on a groove or notch of the testing piece during machining of this groove in the testing piece.

According to another aspect of the invention, a method of trimming burrs which have formed during machining of a groove in a testing piece is provided, which method includes the steps of pressing a cutting edge onto a surface of the testing piece where the burrs have formed, and moving the cutting edge in this condition from an opening of the groove along this surface of the testing piece to trim the burrs.

According to a further aspect of the present invention, provided is a tool for trimming burrs formed on an edge of a groove machined in a testing piece, the tool comprising a body including supporting means having a cushion mechanism; a holder supported on one surface of the body through the cushion mechanism; and a cutting edge fixed to the holder so that the cutting edge is pressed to a surface of the testing piece where the burrs have formed, and is moved in this condition linearly along the surface of the testing piece to trim the burrs off.

It is preferable that the cutting edge may be of a width larger than that of the groove of the testing piece, while being distally tapered, and that an angle of the distal end of the cutting edge may be larger than that of the groove of the testing piece.

According to the other aspect of the present invention, an automatic machining system of shock testing pieces is provided which comprises means for cutting the testing pieces out of a material; means for machining cut surfaces of each testing piece; means for machining a groove in each testing piece; means for automatically trimming the burrs which have formed on the groove of each testing piece; and means for transferring the testing piece, whose burrs have been trimmed off, to inspecting and testing devices.

BRIEF DESCRIPTION OF THE DRAWINGS

The above-stated objects, characteristics and other objects, characteristics, and advantages of the present invention may be clearly understood from the explanations which will be made with reference to the accompanying drawings in which.

DETAILED DESCRIPTION OF THE PREFERRED EMBODIMENT

Figure 10A:
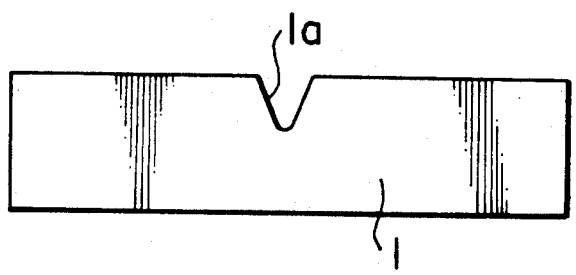
FIGS. 10A and 10B are respectively front and side views showing the shock testing piece of one configuration.
Figure 10B:
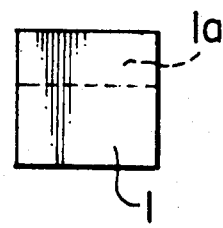
Figure 11A:
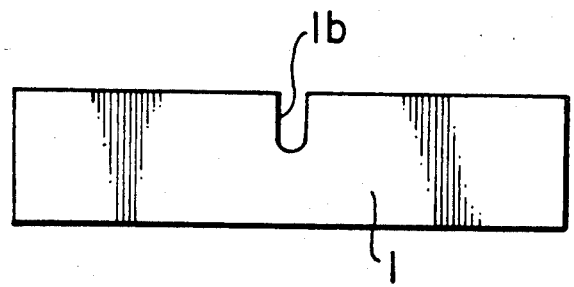
FIGS. 11A and 11B are respectively front and side views showing the shock testing piece of another configuration.
Figure 11B:
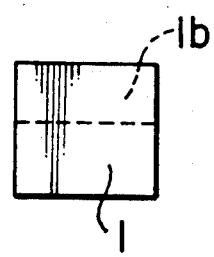
Figure 12:
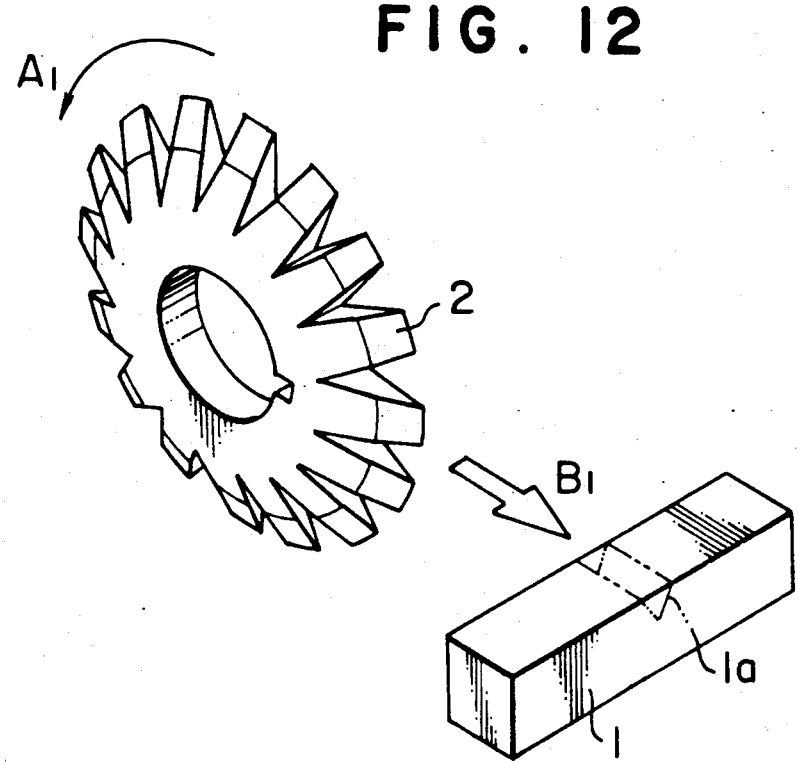
FIG. 12 is a perspective view showing an operating condition of machining a groove or notch in the shock testing piece.
Figure 13:
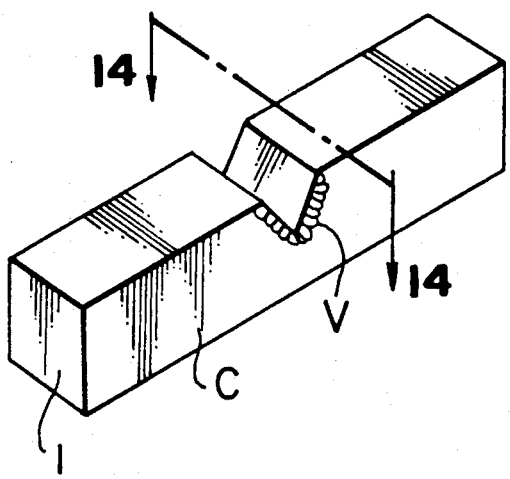
FIG. 13 is a perspective view showing a condition of burrs which are formed on the shock testing piece.
Figure 14:
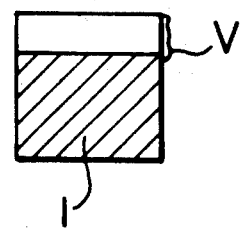
FIG. 14 is a cross sectional view of the shock testing piece taken along a line XIV—XIV in FIG. 13.

A shock testing piece 1 used for metal material tests includes a V-shaped groove or notch 1a as shown in FIGS. 10A and 10B, or a U-shaped groove or notch 1b as shown in FIGS. 11A and 11B. Machining of these grooves 1a, 1b is performed, as illustrated in FIG. 12, by means of a cutter 2 whose cutting edge has a same shape as the groove 1a or 1b to be formed in the shock testing piece 1. In this case, when a rotational direction of the cutter 2 is $A_1$ and a cutting direction thereof is $B_1$, as is clearly seen in FIGS. 13 and 14, burrs V remain at a position where the cutter 2 leaves the piece, i.e., all over a V-shaped edge of the groove on a side surface C of the shock testing piece 1.

Figure 15:
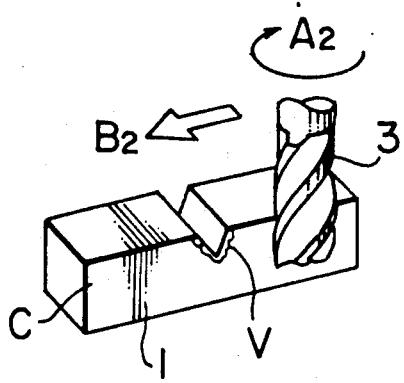
FIGS. 15 to 20 are explanatory views of conventional machinings for removing burrs.
Figure 16:
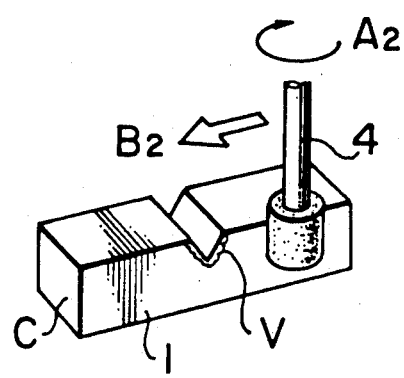
Figure 17:
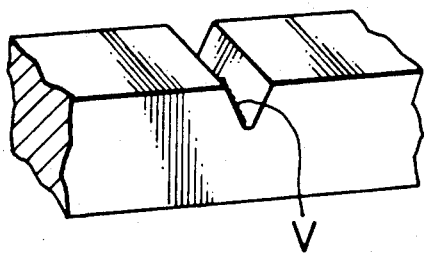
Figure 18:
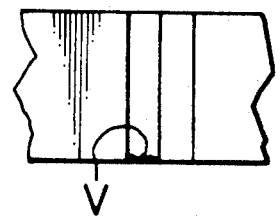
Figure 19:
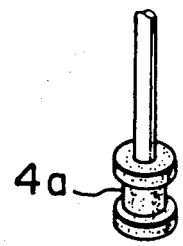

For mechanical removing of such burrs V, two methods respectively employing an end milling cutter 3 whose example is shown in FIG. 15 and an abrasive wheel member 4 whose example is shown in FIG. 16 may be employed. In these cases, when a rotational direction of the end milling cutter 3 or the abrasive wheel member 4 is $A_2$ and a milling or grinding direction thereof is $B_2$, though the burrs V on the side surface C of the shock testing piece 1 can be removed, some of the burrs V are pushed aside and remain immediately behind the left side of the V-shaped groove edge, as shown in FIGS. 17 and 18. These burrs remaining on inside surface of the groove are not permissible, which will be therefore a great problem to be solved. This happens because chips are thrown out in the rotational direction by such cutting tools and, even if the milling or grinding direction is reversed, the burrs V still remain just behind the left side of the groove edge in the same manner. Moreover, if the end milling cutter 3 having counter helical edges rotates in the reverse direction, the burrs V remain immediately behind the right side of the groove edge, i.e., on the other surface of the groove opposite to the above-mentioned case, in whatever direction the milling is done. In the case of the abrasive wheel member 4, as illustrated in FIG. 19, a portion used for grinding the burrs V tends to be worn like a concave surface 4a, so that the face of the abrasive wheel head often requires flattening.

Figure 20:
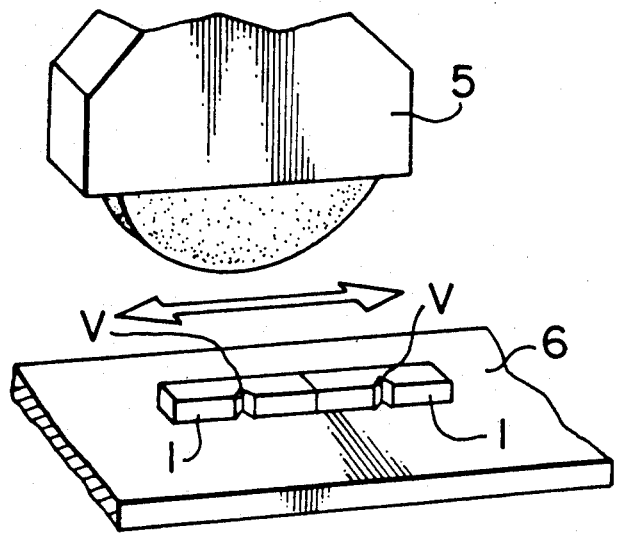

For these reasons, heretofore, the mechanical removing of such burrs cannot be realized on any automation line. Accordingly, as is illustrated in FIG. 20, after a grinding tool 5 has ground the side surface of the shock testing piece 1 set on a table 6, the burrs remaining immediately behind the V-shaped groove edge are, in fact, removed manually. That is to say, even if the grinding tool 5 is incorporated into an automated line, the burrs cannot be removed completely, so that the manual operations will be inevitably required, thereby becoming an obstacle to perfectly automating the manufacturing line.

Figure 21:
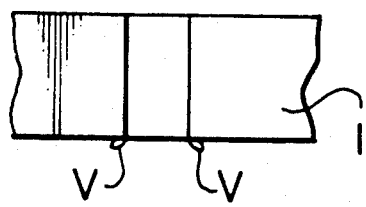
FIGS. 21 to 25 are explanatory views illustrating the principle of the burr trimming according to the present invention.
Figure 22:
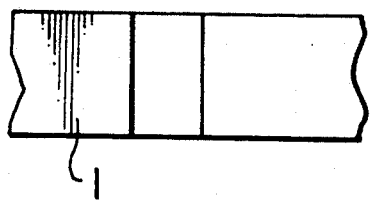
Figure 23:
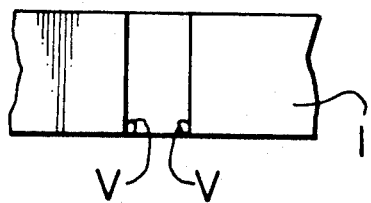
Figure 24:
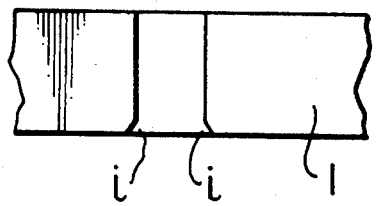

As has been described hereinabove, the reason why burrs cannot be removed completely by such machining is that, because of the rotation of cutting tools, chips are thrown out in their rotational direction. In order to solve this problem, according to the method of the present invention a cutting tool is linearly moved without rotating the same, in a direction along a surface where burrs remain. In other words, as previously described, when the burrs V after machining are viewed in a plane, as illustrated in FIG. 21, the burrs remain on the side surface immediately outside of the groove. It is necessary to completely remove the burrs V with none of them being left behind, as shown in FIG. 22, because the burrs V which remain within the groove as shown in FIG. 23 and chamfers i which are formed on the groove edge as in FIG. 24 are not permissible.

Figure 25:
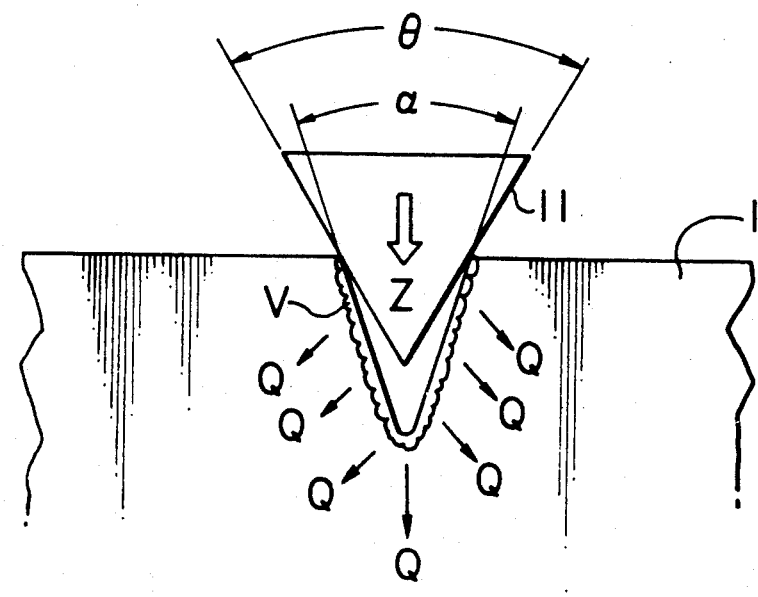
Figure 26A:
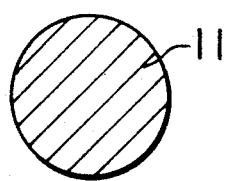
FIGS. 26A to 26F are cross sectional views showing other examples of cutting edges which are applicable to the burr trimming tool of the present invention.
Figure 26B:
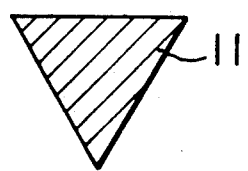
Figure 26C:
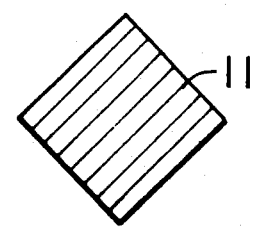
Figure 26D:
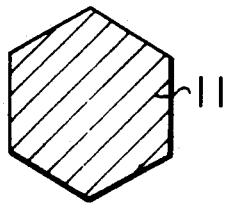
Figure 26E:
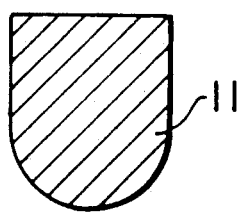
Figure 26F:
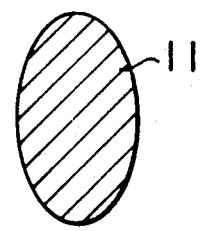

According to the present invention, a burr trimming tool for removing such burrs comprises a body including a cushion mechanism; a holder elastically supported on the body; and a cutting edge fixed to the holder for trimming burrs off a V-shaped groove edge of a shock testing piece. As illustrated in FIG. 25, it is particularly desirable that an angle $\theta$ of the cutting edge 11 is larger than an angle $\alpha$ of the groove.

Since the burr trimming tool of the present invention is so constituted that the cutting edge is fixed to the holder which includes the cushion mechanism, the surface of the cutting edge can be precisely controlled to be at a level identical with that of the holder when the cutting edge is fastened to the holder. Consequently, the cushion mechanism can function by approaching the surface of the holder to the piece, which has been machined, with respect to the side surface of the piece on which the burrs are left, and by further forcing, to a certain extent, the surface of the holder to this side surface of the piece. By sliding the thus positioned tool in the direction along the burrs on the side surface of the piece, the burrs are trimmed off. At this moment, the cutting edge is on the identical level with the surface of the holder, and never leaves or comes out of contact with the side surface of the machined piece on which the burrs remain due to the provision of the cushion mechanism, so that the burrs can be completely removed with none of them being left behind and no excess material is removed from the machine piece. In addition, when the angle $\theta$ of the cutting edge 11 is larger than the angle $\alpha$ of the groove, by sliding the cutting edge 11 in the direction of an arrow Z shown in FIG. 25, the burrs V are pushed aside in directions of arrows Q so as to be trimmed off. As a result, the burrs will not come into the groove to remain therein, so that as shown in FIG. 22, the burrs V which have remained on both side edges of the V-shaped groove can be completely trimmed off. Besides, due to the difference between the angle $\theta$ of the cutting edge 11 and the groove angle $\alpha$, the trimming resistance to the cutting edge is reduced and the burrs are removed smoothly.

Figure 1:
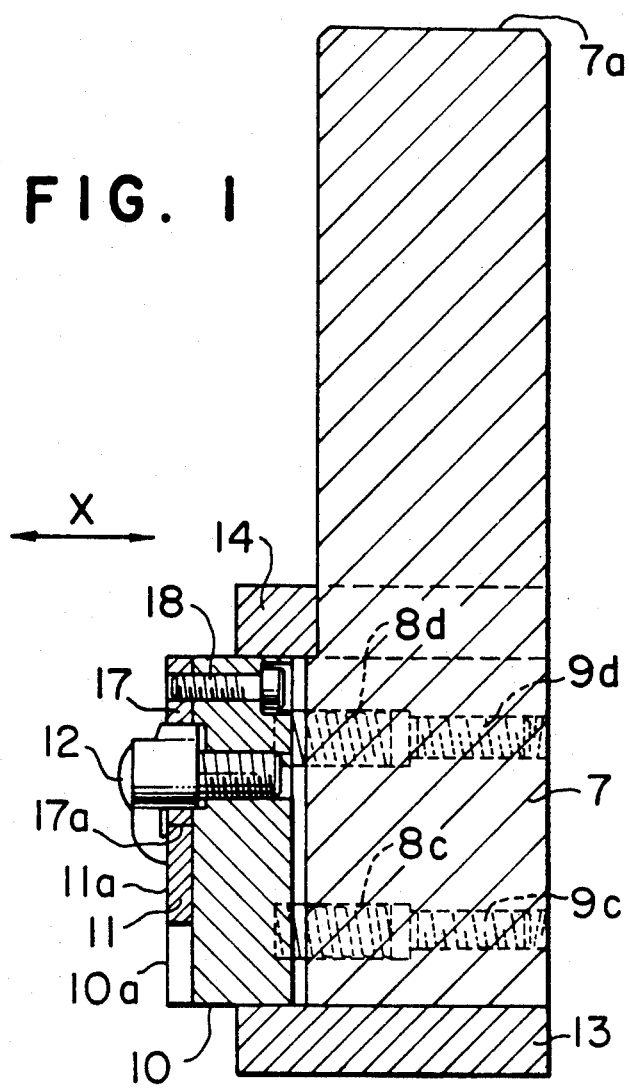
FIG. 1 is a cross sectional view of a burr trimming tool according to one embodiment of the present invention.
Figure 3:
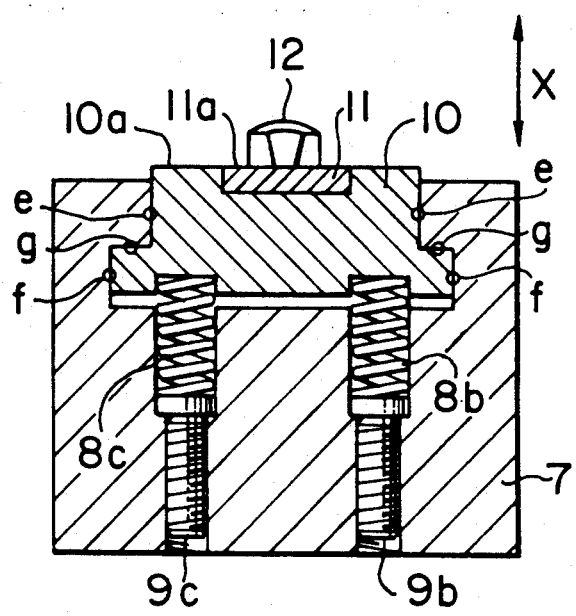
FIG. 3 is a cross sectional view of the tool taken along a line III—III in FIG. 2.
Figure 2:
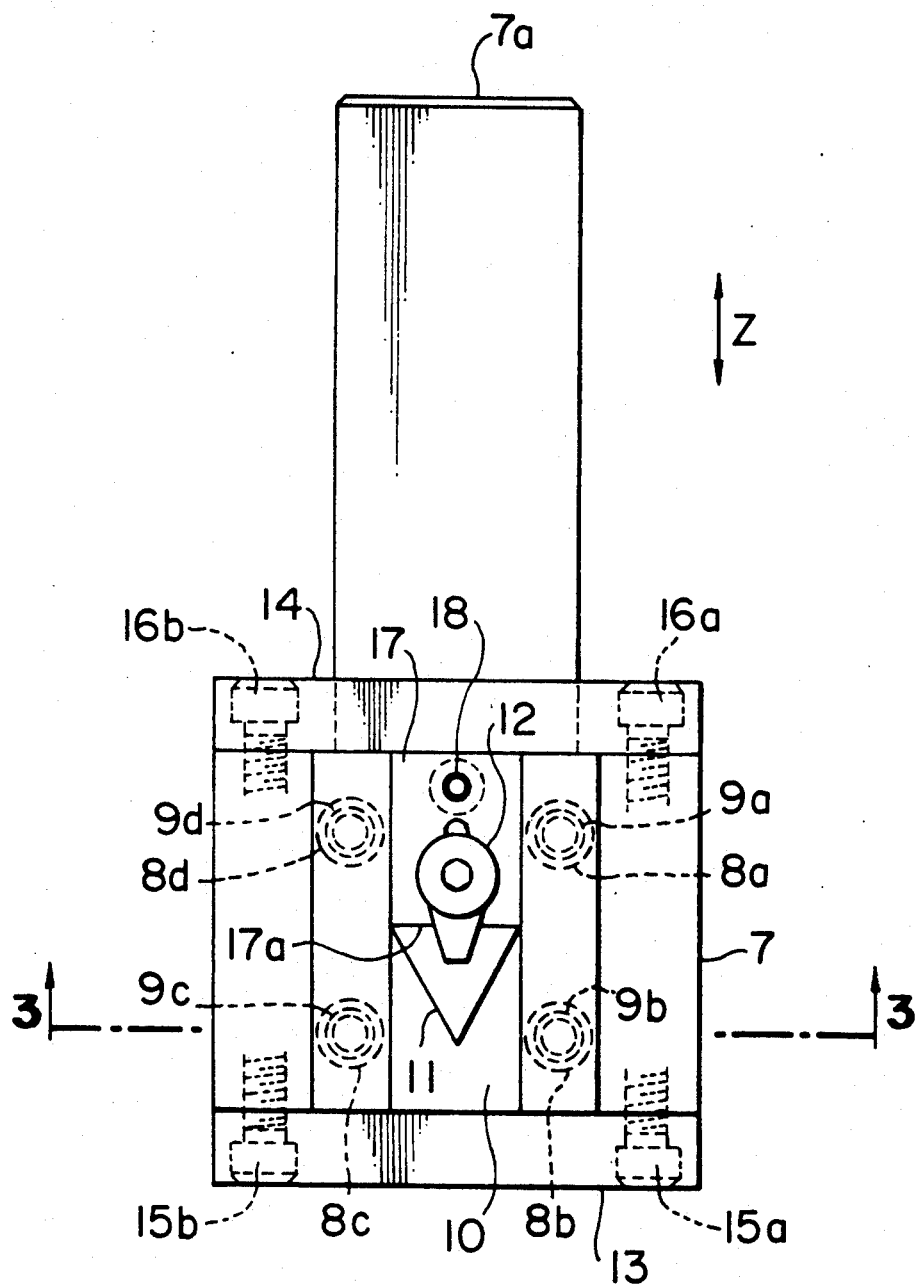
FIG. 2 is a left side view of the tool shown in FIG. 1.
Figure 4:
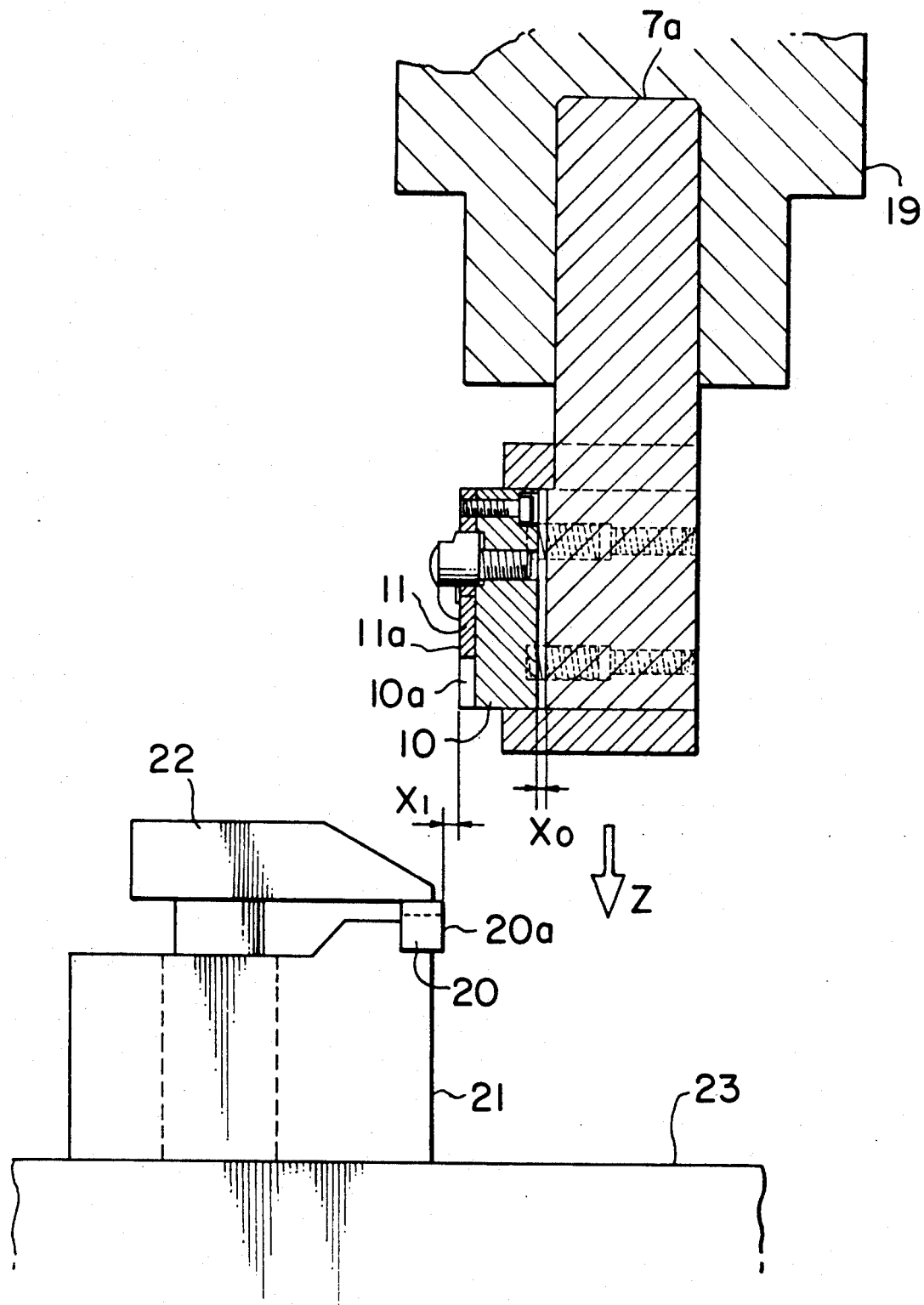
FIGS. 4 to 8 are explanatory views illustrating a burr trimming operation with the burr trimming tool shown in FIG. 1.
Figure 5:
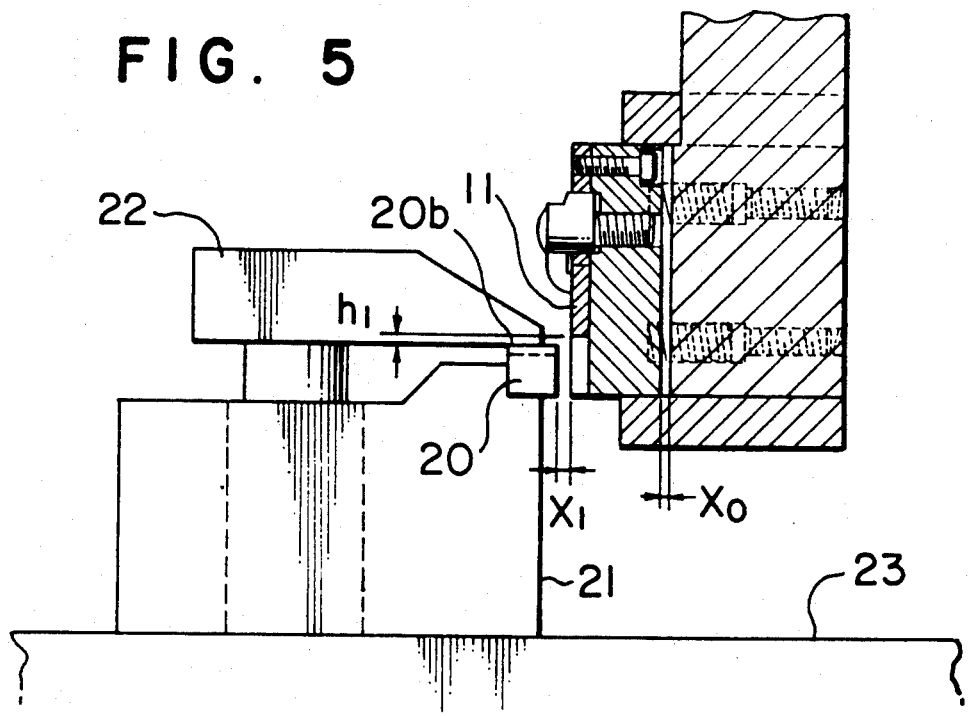
Figure 6:
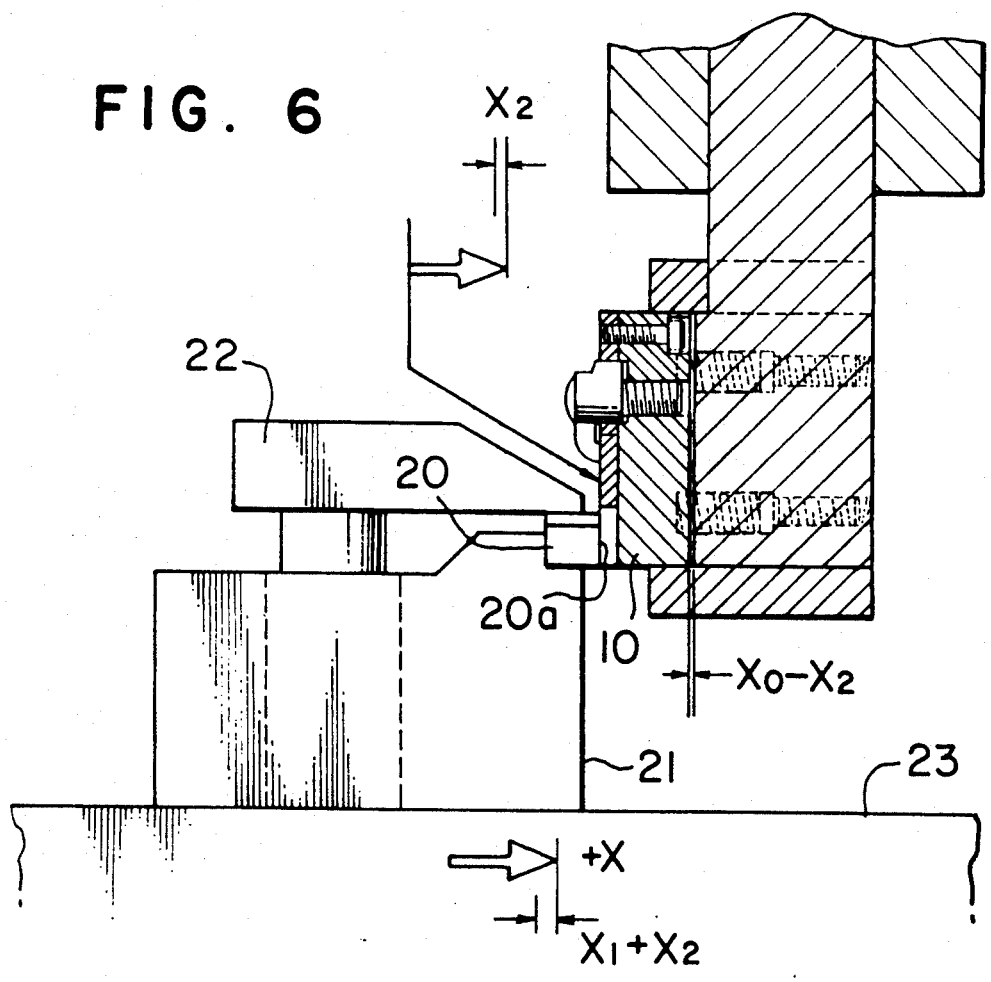
Figure 7:
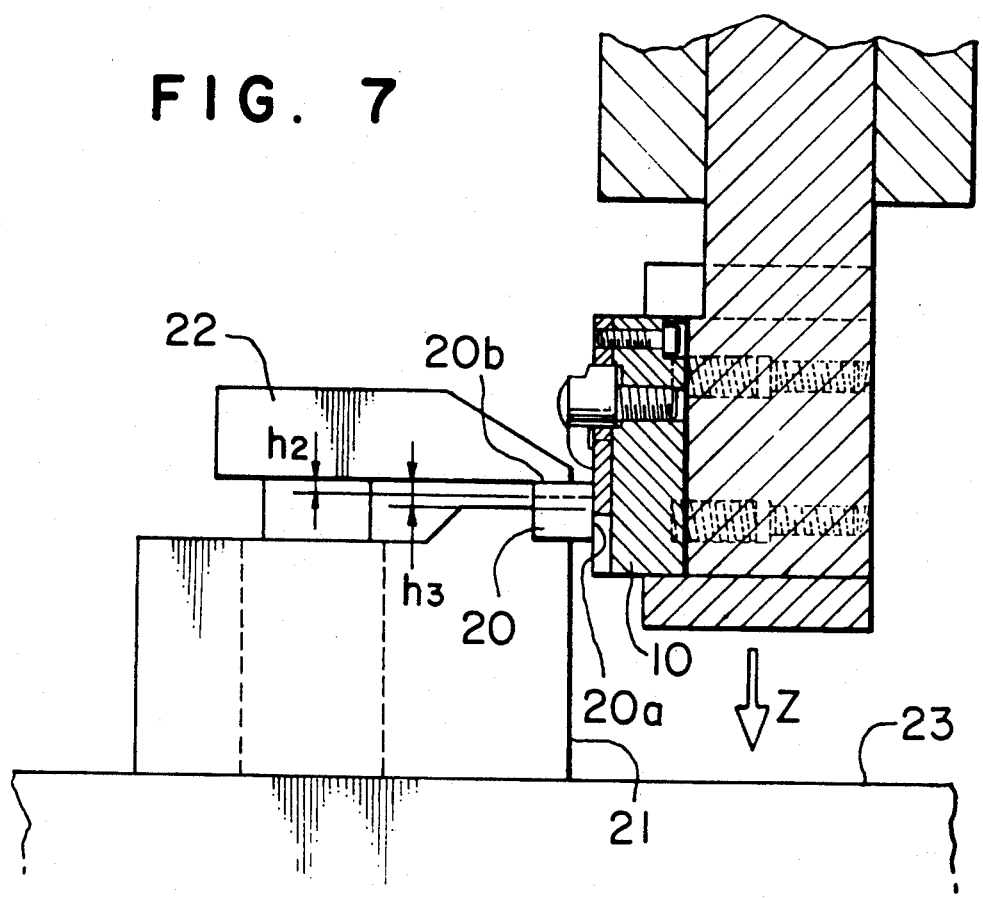
Figure 8:
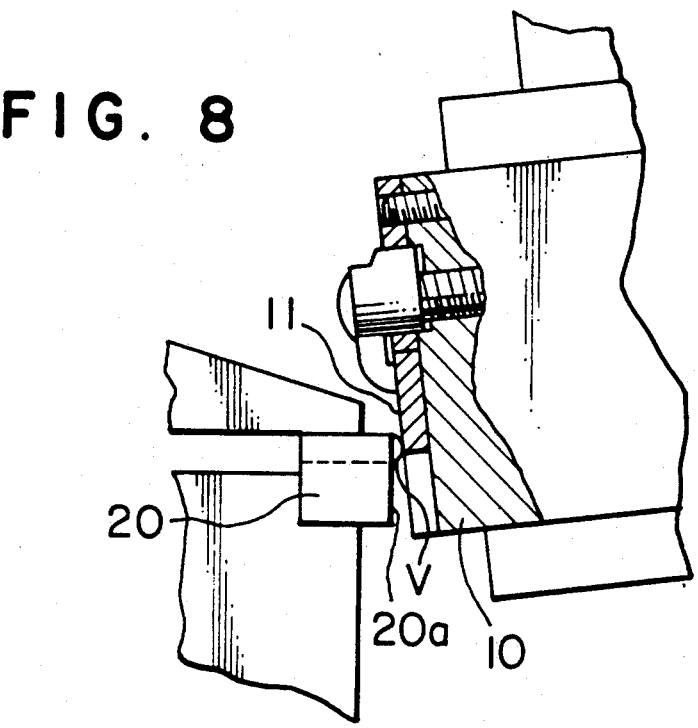

As shown in FIGS. 1-3, the burr trimming tool according to an embodiment of the present invention includes a body 7 on a top of which is provided a shank 7a to be attached to a main shaft of a machine tool. In a central portion of the body 7, laterally extending through holes are provided, which receive springs 8a, 8b, 8c, 8d for the cushion mechanism and screws 9a, 9b, 9c, 9d for pressing these springs to control the amounts of protruding of the springs outwardly from the body. A holder 10 adapted to be supported by the body 7 has a setting surface which is opposite to a surface thereof to be fixed to the body 7, and this setting surface is provided with a recess in which the cutting edge 11 is set. When the cutting edge 11 is set in the recess of the holder 10 by a screw 12, the surface 10a of the holder 10 and the surface 11a of the cutting edge 11 are at the identical level. Moreover, the holder 10 has stepped portions e, f formed on both sides thereof and is mounted on the body 7 with the stepped portions f, f fitted in stepped groove portions of a complementary contour which are formed in the body 7 (see FIG. 3), so that the holder is cushionedly movable in a X direction by or against the springs 8a, 8b, 8c, 8d. Shoulder portions g serve as stoppers for limiting a movement of the holder 10 by the cushion function. End plates 13, 14 are respectively fastened to the body 7 by pairs of screws 15a, 15b, and 16a, 16b for stopping a movement of the holder 10 in a Z direction. A setting guide 17 for the cutting edge 11 which is also received in the recess of the holder 10, and the cutting edge 11 is set in the recess with its upper end abutting a surface 17a of the setting guide 17. This setting guide 17 is fastened on the holder 10 by a screw 18. As shown in FIG. 4, the shank 7a of the burr trimming tool is fastened to the main shaft of the machine tool by an arbor 19. A machined piece 20 to be deburred is set onto a jig 21 on a machine table 23 by a clamp 22. In this condition, keeping the surface 10a of the holder 10 at a distance $x_1$ from a side surface 20a to be machined of the machined piece 20 where burrs remain, the burr trimming tool is moved downwardly in the $-Z$ direction. The downward movement of the trimming tool in the $-Z$ direction is stopped, when the cutting end of the cutting edge 11 comes to a position at a distance $h_1$ from an upper surface 20b of the machined piece as shown in FIG. 5. After that, as illustrated in FIG. 6, the machine table 23 is moved in the $+X$ direction by the amount corresponding to both of the above-stated distance $x_1$ and a cushion amount $x_2$ of the springs 8a, 8b, 8c, 8d. Accordingly, the holder 10 and the cutting edge 11 are pressed toward the body 7 by the cushion amount $x_2$. Provided that a gap between the body 7 and the holder 10 before such pressing is $x_0$, the gap after this operation is to be $x_0-x_2$. In this condition, as illustrated in FIG. 7, by further moving the burr trimming tool in the $-Z$ direction over a distance $h_1+h_2+h_3$, the burrs can be completely removed. Reference letter $h_2$ is a distance from the upper surface 20b of the machined piece 20 to the bottom of the groove, and $h_3$ is a movement amount of the tool for trimming the burrs. Thus, the holder 10 is pressed against the side surface 20a of the machined piece 20 and moves therealong while being exerted with the cushion function, so that the cutting edge 11 may not be pushed up by the burrs V during the trimming operation as shown in FIG. 8, thereby completely trimming the burrs. Moreover, because the surface 11a of the cutting edge 11 and the surface 10a of the holder 10 are on the identical level, the side surface 20a of the machined piece 20 where the burrs remain is not to be scratched nor excessively removed, and consequently the burrs can be adequately trimmed off. Furthermore, in this embodiment the cutting edge is of a triangular shape having a vertical angle slightly larger than that of the V-shaped groove edge of the machined piece 20 in order to obtain an effect of reducing the trimming resistance during the burr trimming.

The cutting edge 11 may be of various shapes, such as, for example, circular, triangular, rectangular, hexagonal, semi-circular, and elliptic as shown in FIGS. 26A to 26F. The shape of the cutting edge, however, is to be selected considering such factors as the shape of the groove; the trimming resistance during the burr trimming; the efficiency of the burr trimming; and whether the burrs remain within the groove or not, while any of the above shapes can be employed simply for removing the burrs.

Figure 9:
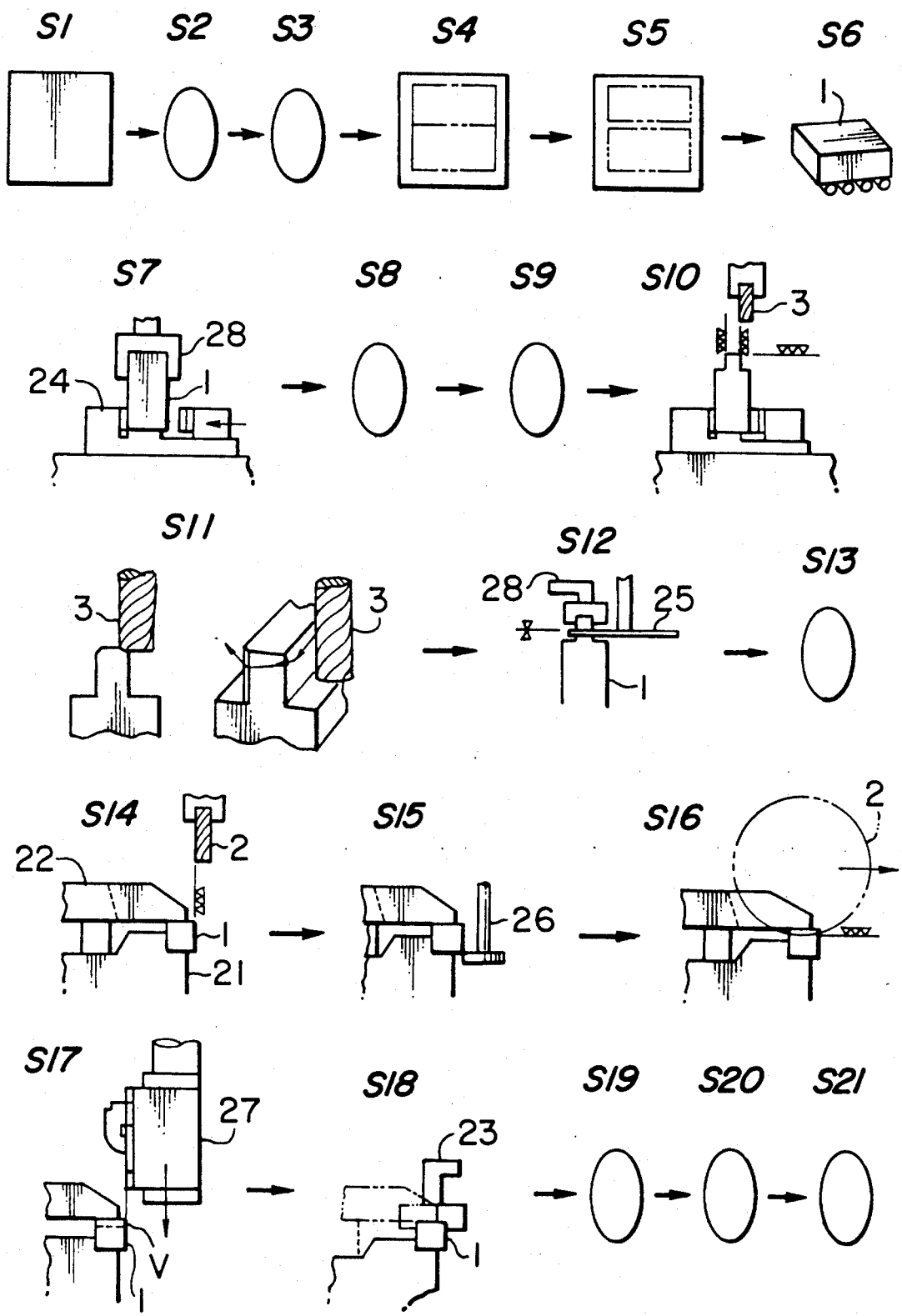
FIG. 9 is a diagrammatical view of machining steps of shock testing pieces in an automatic machining system according to an embodiment of the present invention.

The automatic machining system for shock testing pieces according to another embodiment of the invention will be described with reference to FIG. 9 in which machining steps S1 to S21 in the automatic machining system are illustrated. In this drawing, the steps S1 to S6 indicate an automatic fusion cutting process of the testing pieces. First, a metal material for the testing pieces is received (the step S1), checked up (the step S2), measured (the step S3), and marked by a marking press (the step S4). Then, this metal material is automatically fused and cut into testing piece material units (the step S5), and the units of the testing piece material 1 are transferred one by one on a conveyor (the step S6).

The steps S7 to S18 indicate a machining process of the testing pieces. Each unit of the testing piece material 1 is delivered by a robot 28 to a jig 24 to be clamped thereon (the step S7). Then, after processing of a reference surface for clamping and the marked surface of the unit 1 is performed (the step S8), the robot 28 delivers the unit back to the jig 24 to clamp the unit on the jig again (the step S9). Since it is usual that one unit of the testing piece material 1 is cut into several testing pieces, the upper and side surfaces of a portion of the unit which becomes a first testing piece are roughed and then finished by an end milling cutter 3 (the step S10). Subsequently, utilizing a corner R of the end milling cutter 3, minute chamfering of ridges and corners of the unit on the jig 24 is performed (the step S11). After grasping an upper portion of the unit 1 by the robot 28, the first testing piece 1 is divided from the unit by a metal slitting saw 25 (the step S12). The first divided piece 1 is transferred by the robot 28 so as to be grasped anew (the step S13). In the next stage of the process, the testing piece 1 is delivered to another jig 21 to be fastened thereon by a clamp 22, and then the robot stands back. Then, the end milling cutter 3 carries out machining of the divided surface of the testing piece 1 and minute chamfering of its corners and ridges simultaneously (the step S14). After that, a bottom chamfer cutter 26 minutely chamfers bottom ridges of the testing piece 1 after the machining of the divided surface (the step S15).

In the next stage, a groove is formed in the testing piece 1 by the cutter 2 for machining grooves (the step S16), and burrs remaining on an edge of the groove of the testing piece 1 are removed by a burr trimming tool 27 (the step S17). As a matter of course, this burr trimming tool 27 is constituted according to the present invention and may have the same structure as the above-mentioned embodiment of the invention. After the burrs have been trimmed, the testing piece 1 is delivered from the jig 21 by the robot 28 (the step S18). The steps S19 to S21 indicate an automatic testing process. The testing piece 1 having been transferred by the robot, its cleansing is first performed (the step S19), and the whole size thereof is measured and checked up by an automatic measuring instrument (the step S20), so that the testing piece 1 can be finally introduced to a testing machine (the step S21).

As has explained so far, this automatic machining system cannot be completely automated without incorporating the burr trimming tool of the present invention into its automation line for machining testing pieces. Because such burr trimming work, which has conventionally been carried out by manual operations and which consumed a great part of the working time, can now be performed within the perfectly automated machining system, the efficiency of the work will be remarkably increased.

Figure 27:
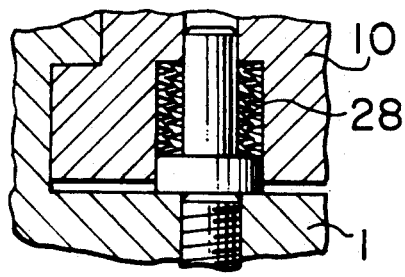
FIGS. 27 to 29 are cross sectional views showing other examples of cushion mechanisms which are applicable to the burr trimming tool of the present invention.
Figure 28:
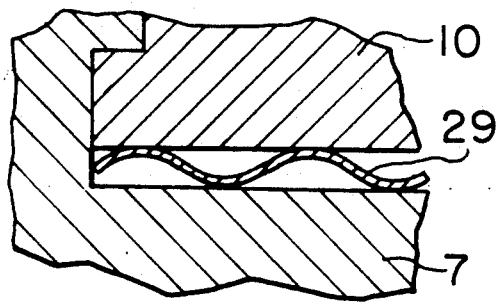
Figure 29:
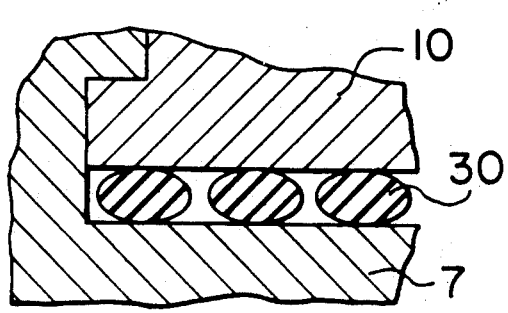
Figure 30:
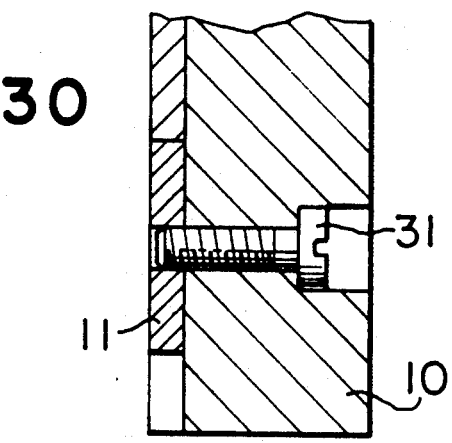
FIGS. 30 to 32 are cross sectional views showing other examples of fixing methods of the cutting edge which are applicable to the burr trimming tool of the present invention.
Figure 31:
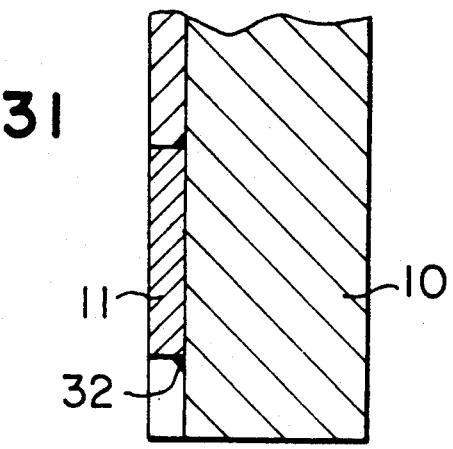
Figure 32:
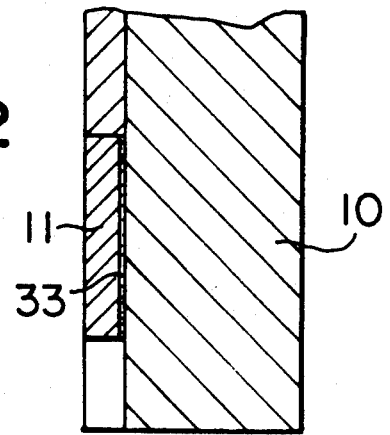

Although in the above-described embodiment, the helical compression springs are used for the cushion mechanism of the burr trimming tool, the cushion mechanism may sufficiently function in the same manner even when belleville springs 28 as shown in FIG. 27, corrugate leaf springs 29 as in FIG. 28, elastic members 30 as in FIG. 29, or the like are used instead of the helical springs. With respect to the fastening of the cutting edge to the holder, other than the method of pressing the cutting edge thereto by the screws, such methods that the cutting edge is provided with an internal thread therein so as to be fixedly drawn inwardly by a bolt 31, as illustrated in FIG. 30; that the cutting edge is jointed to the holder by direct welding 32 or the like as in FIG. 31; and that the cutting edge is strongly attached to the holder by an adhesive 33 as in FIG. 32 may be taken alternatively, while the latter two methods in use of welding and adhesion have difficulties in replacing the cutting edge. To further develop the idea of the invention, another method of integrally combining the cutting edge with the holder and thermally treating the cutting edge only may be taken. As for the shank of the body, by the way, it goes without saying that either a straight or a tapered shank can be employed.

As will be clearly understood from the above explanation, the present invention makes it possible that the burrs remaining on each machined piece are automatically and completely removed by the trimming tool without manual operations. Therefore, this invention can perfectly automate the machining system of shock testing pieces which has conventionally had some difficulties in its perfection, so that uniform testing pieces can be economically produced.

Although the present invention has been described on the basis of the embodiments theretofore, it should be understood that this invention is not limited to these specific forms, and that various changes can be made and the invention can be embodied in other forms without deviating from the scope of the attached claims.

What is claimed is:

1. A tool adapted for trimming burrs formed on an edge of a groove machined in a testing piece, the tool comprising: a body including supporting means having a cushion mechanism; a holder supported on one surface of said body by said supporting means; and a cutting edge fixedly mounted to said holder so as to enable the cutting edge to be pressed against a surface of the testing piece where the burrs have formed and in this condition enable a substantially linear movement of the current edge along said surface of the testing piece to trim off the burrs.

2. A tool adapted for trimming burrs formed on an edge of a groove machined in a testing piece, comprising: a body including supporting means having a cushion mechanism; a holder supported on one surface of said body by said supporting means; and a cutting edge fixedly mounted to said holder so that the cutting edge is pressed to a surface of said testing piece where the burrs have formed and is adapted to be moved while in this pressing condition substantially linearly along the surface of said testing piece to trim off the burrs therefrom, wherein said holder has a reference surface and is adapted so that when said cutting edge is mounted on said holder one surface of said cutting edge is identical in level with that of said reference surface, and wherein said one surface of said cutting edge is arranged to confront the surface of said testing piece where the burrs have formed.

3. A tool adapted for trimming burrs formed on the edge of a groove machined in a testing piece, comprising: a body including supporting means having a cushion mechanism; a holder supported on one surface of said body by said cushion mechanism; and a cutting edge fixedly mounted to said holder so that the cutting edge is pressed to a surface of a testing piece where the burrs have formed and is adapted to be moved while in this pressing condition substantially linearly along said surface of the testing piece to trim off the burrs therefrom, wherein said body includes at least one end plate for preventing movement of said holder in a direction perpendicular to a direction of cushioning of said cushion mechanism.

4. The tool according to claim 1, wherein said body has on an upper portion thereof a shank which can be automatically connected to a main shaft of a machine tool.

5. The tool according to claim 2, wherein said body includes at least one end plate for preventing movement of said holder in a direction perpendicular to a direction of cushioning of said cushion mechanism.

6. The tool according too claim 1, wherein said cutting edge has a width larger than a width of said groove, and wherein said cutting edge tapers in a direction of a distal end thereof.

7. The tool according to claim 1, wherein said cutting edge is dimensioned to include a distal end tapering at an angle larger than an angle of said groove of said testing piece and thereby assure trimming off of all burrs.

8. An apparatus adapted for trimming burrs formed on an edge of a groove of a testing piece during machining of the groove, the apparatus comprising: jig means for setting said testing piece with the burrs of the groove being oriented in an outward direction; a burr trimming tool comprised of a body including supporting means having a cushion mechanism, a holder supported by said supporting means of said body and being resiliently urged in a direction away from said body by said cushion mechanism, and a cutting edge fixed to said holder; and means for moving said burr trimming tool with respect to said testing piece such that the cutting edge is pressed to a surface of said testing piece where the burrs have formed and is linearly moved from an opening side of said groove toward a bottom side of said groove along said surface of said testing piece to trim off the burrs.

9. A tool for trimming burrs adapted to be pressed against a surface of a testing piece where burrs have formed on an edge of a groove machined in said testing piece and to be substantially linearly moved relative to said testing piece in a direction from an opening side of the groove toward a bottom of the groove to trim off the burrs, the tool comprising: a body; a holder; means for movably supporting said holder on said body; cushion means for resiliently urging said holder in a direction away of said body; and a cutting edge fixedly mounted to said holder, wherein said cutting edge has a flat surface on the opposite side thereof from said holder and a distal end tapering in a direction corresponding to that of the linear movement of the burr trimming tool.

10. A tool according to claim 9, wherein said holder has recess means formed therein for receiving said cutting edge, said recess means extending substantially in the direction of linear movement of the burr trimming tool.

11. A tool according to claim 9, wherein said holder has a reference surface with which said flat surface of said cutting edge mounted to the holder is identical in level, and wherein said flat surface of the cutting edge is arranged to confront the surface of said testing piece where the burrs have formed.

12. A tool according to claim 9, wherein said body includes at least one end plate which is fixedly mounted to said body in slidable contact with said holder to prevent movement of said holder in a direction perpendicular to a direction of cushioning said cushion means.

13. A tool according to claim 9, wherein said body has on an upper portion thereof a shank adapted for connection with a main shaft of a machine tool.

14. A tool according to claim 9, wherein said cutting edge is dimensioned so as to have a distal end thereof which tapers to provide a maximum width larger than a width of the opening of the groove in said testing piece and thereby assure a complete trimming off of all burrs.

15. An apparatus adapted for trimming burrs formed on an edge of a groove machined in a testing piece, the apparatus comprising: jig means for setting the testing piece; a burr trimming tool including a body, a holder, means for movably supporting said holder on said body, cushion means for resiliently urging said holder in a direction away of said body, and a cutting edge fixedly mounted to said holder, wherein said cutting edge has a flat surface on the opposite side thereof from said holder and is tapering at a distal end thereof; and means for driving said burr trimming tool in a direction in which the distal end of said cutting edge is pressed against a surface of said testing piece where the burrs have formed and in another direction in which said tapering distal end acts as a forward end to the cutting edge in which it is moved substantially linearly from an opening side of the groove toward a bottom side of the groove along the surface of said testing piece to trim off the burrs.

* * * * *